United States Patent [19]

Wellwood et al.

[11] Patent Number: 5,718,873
[45] Date of Patent: Feb. 17, 1998

[54] COUNTERCURRENT GAS-SOLID CONTACTING

[75] Inventors: Grant A. Wellwood, Victoria, Australia; Martin A. Groszek, Berkshire, United Kingdom; Matthew Ion Liddy, Queenland, Australia

[73] Assignee: Comalco Aluminium Limited, Melbourne, Victoria, Australia

[21] Appl. No.: 640,951

[22] PCT Filed: Nov. 16, 1994

[86] PCT No.: PCT/AU94/00706

§ 371 Date: Oct. 1, 1996

§ 102(e) Date: Oct. 1, 1996

[87] PCT Pub. No.: WO95/13866

PCT Pub. Date: May 26, 1995

[30] Foreign Application Priority Data

Nov. 16, 1993 [AU] Australia ................... PM2464

[51] Int. Cl.⁶ ................................................ B01D 50/00
[52] U.S. Cl. ........................ 422/171; 422/169; 422/170; 423/240 S
[58] Field of Search ................................. 422/169, 170, 422/171; 423/240 S

[56] References Cited

U.S. PATENT DOCUMENTS

| | | | |
|---|---|---|---|
| 3,503,284 | 3/1970 | Knapp et al. | 55/71 |
| 3,706,565 | 12/1972 | Fish | 55/71 |
| 3,780,497 | 12/1973 | Muhirad | 55/71 |
| 3,876,394 | 4/1975 | Nix | 55/71 |
| 3,892,551 | 7/1975 | Burnham | 55/390 |
| 4,065,271 | 12/1977 | Weckesser et al. | 55/2 |
| 4,176,019 | 11/1979 | Dethloff | 204/67 |
| 4,479,920 | 10/1984 | Dodson | 422/143 |
| 4,501,599 | 2/1985 | Loukos | 55/71 |
| 4,525,181 | 6/1985 | Böckman | 55/71 |
| 4,559,719 | 12/1985 | Dodson | 34/10 |
| 5,073,121 | 12/1991 | Jaenke et al. | 439/92 |

FOREIGN PATENT DOCUMENTS

| | | |
|---|---|---|
| 470782 | 3/1976 | Australia. |
| 485781 | 8/1977 | Australia. |
| 493856 | 6/1978 | Australia. |
| 85409/82 | 8/1986 | Australia. |
| 14343/88 | 9/1990 | Australia. |
| 12888/88 | 6/1991 | Australia. |
| 25576/88 | 9/1991 | Australia. |
| 16154/88 | 10/1991 | Australia. |
| 2206979 | 6/1974 | France. |
| 936 386 | 12/1955 | Germany. |
| 1 020 608 | 12/1957 | Germany. |
| 785322 | 10/1957 | United Kingdom. |
| 1416344 | 12/1975 | United Kingdom. |
| 1458673 | 12/1976 | United Kingdom. |

OTHER PUBLICATIONS

The Torbed Process—A Small Revolution in Heat and Mass Transfer.

*Primary Examiner*—Edward J. Cain
*Attorney, Agent, or Firm*—Nikaido, Marmelstein, Murray & Oram LLP

[57] ABSTRACT

An apparatus (50) for contacting a gas stream (62) with solid particulate material includes two contacting zones (58, 60). Sets of angled blades (54, 56) cause gas flowing through the contacting zones (58, 60) to have a swirling circumferential velocity. Solid particulate material is fed from hopper (70) via line (72) to the upper contacting zone (56), in which the swirling gas flow causes a turbulent band of particles (60) to form. Contact between the gas and the solid occurs in this band of particles. Overflow of particles from band (74) flows down conduits (76, 77) and into lower contacting zone (58). The swirling gas flow in contacting zone (58) causes a turbulent band of particles (78) to be established. The gas stream enters at conduit (62) and travels through the turbulent band of particles (78) in the lower contacting zone (58). The gas then passes through restriction (66), through the turbulent band of particles (74) in upper contacting zone (60) and then leaves the apparatus (50) via outlet (68). Solid is removed from the lower contacting zone (58) via conduits (82, 84). The apparatus allows for counter-current gas-solid contacting and is particularly suitable for use in gas scrubbing operations.

16 Claims, 2 Drawing Sheets

COUNTERCURRENT GAS-SOLID CONTACTING

The present invention relates to a process and an apparatus for gas-solid contacting. The present invention is especially suitable for the removal of hydrogen fluoride from process gas streams by adsorption on alumina and, for convenience, the invention will be described with reference to the removal of hydrogen fluoride from gas streams. However, it is to be understood that the present invention is generally applicable to gas-solid contacting and that the invention should not be considered to be limited to hydrogen fluoride removal.

In the production of aluminium by the electrolytic reduction of alumina dissolved in molten cryolite, off-gases collected from the reduction cells contain appreciable quantities of gaseous fluorides. These fluorides, generally in the form of hydrogen fluoride, are required to be removed from the off-gases prior to venting of the off-gases in order to meet environmental regulations. Recovery of the fluorides in the off-gases is also desirable from an economic viewpoint, as such fluorides may be recycled to the reduction cells.

Gaseous fluorides are often removed from the off-gases of aluminium smelters by a dry scrubbing technique. This technique involves contacting the raw potline off-gases with alumina particles, which results in the fluorides being adsorbed onto the alumina particles. The alumina particles are removed from the off-gas stream in a solids collector, which also collects any entrained particles from the reduction cell present in the off-gas. The alumina and any entrained particles are collected from the baghouse and become feedstock for the reduction cells.

Conventional dry scrubbing systems employed at aluminium smelters may require all of the smelter's alumina feedstock to be used in controlling fluoride emissions. From the metal production point of view, this has at least two implications:

i) as the alumina used in the scrubbing of off-gases has an increased impurity loading, the ability of the smelter to produce high purity metal is reduced; and ii) the ability to increase specific metal production through changes in bath chemistry is reduced.

Therefore, it may be desirable to reduce the amount of alumina required for fluoride removal from off-gases whilst maintaining fluoride levels in the vented off-gases at an acceptable level.

The present applicant, in International Patent Application No. PCT/AU91/00342, has proposed a dry scrubbing process in which particulate material is contacted with a high velocity off-gas stream to reduce the resistance to mass transfer attributable to the diffusion boundary layer around the solid particles to provide higher mass transfer rates. It has also been found that the fine particles sized less than 45 μm contain a disproportionate amount of contaminant trace metals from the gas stream and the fine fraction is removed in order to reduce the amount of such trace metals recycled to the reduction cells.

The process of International Patent Application No. PCT/AU91/00342 is carried out in a toroidal bed reactor, such as is described in Australian Patent No. 554,537, in the name of Torftech Limited, the entire contents of which are herein incorporated by reference. This patent describes a method and an apparatus for processing a mass of particulate material. The apparatus includes an annular treatment zone having a number of angled vanes located below the treatment zone. Gas is passed through the angled vanes, which cause the gas to enter the treatment zone with a swirling flow pattern. Solid material is fed to the treatment zone and the swirling gas flow therein produces a turbulent band of solid particulate material in the treatment zone. The apparatus also includes a gas outlet and means to remove solid particulate material from the treatment zone.

In Australian Patent No. 616,406, also in the name of Torftech Limited, a toroidal bed reactor for treating particulate and/or liquid material is described. This reactor includes two or more annular treatment zones. In the case where only two annular treatment zones are used, the first treatment zone is located lowermost in the apparatus. The second annular treatment zone is concentric with the first treatment zone, but has a larger diameter and is located above the first annular treatment zone. Both the first and the second annular treatment zones have separate gas inlet means for feeding separate fresh inlet gas into each respective treatment zone. In use, solid particulate material is fed to the upper of the annular treatment zones, where it is treated with fresh inlet gas. The overflow solid particulate material from the upper annular treatment zone flows into the lower annular treatment zone, where it is treated with further separate fresh inlet gas. Overflow solid particulate material from the lower annular treatment zone is recovered. This apparatus operates as a multi-stage, cross current flow system in which the solid material is sequentially contacted with separate, fresh inlet gas.

The present invention provides an alternative process and apparatus for gas solid contacting.

In a first aspect, the present invention provides a process for contacting solid particulate material with a gas comprising a process for contacting a gas with solid particulate material in a plurality of annular contacting zones comprising supplying a feed gas to a lowermost contacting zone and thereafter passing the feed gas successively through each other of the plurality of contacting zones wherein the gas leaving one contacting zone passes to an upwardly adjacent contacting zone, supplying solid particulate material to an uppermost contacting zone and thereafter transferring the solid particulate material successively to each other of the plurality of contacting zones wherein the solid particulate material is transferred from one contacting zone to a downwardly adjacent contacting zone, wherein the gas passing through each of the plurality of contacting zones is imparted with upward and circumferential velocity in each of the contacting zones and the gas contacts the solid particulate material in each of the plurality of contacting zones and a toroidal band of particles is formed in each of the plurality of contacting zones, and extracting solid particulate material from the lowermost contacting zone.

Preferably, the plurality of contacting zones comprises two contacting zones and the process comprises supplying a gas to a first contacting zone, said gas being imparted with an upward and circumferential velocity in the first contacting zone, the gas contacting solid particulate material in the first contacting zone, removing an exhaust gas from the first contacting zone and recovering a treated solid particulate material from the first contacting zone, supplying the exhaust gas from the first contacting zone to a second contacting zone, the second contacting zone being located above the first contacting zone, the gas being imparted with an upward and circumferential velocity in the second contacting zone, the gas contacting solid particulate material in the second contacting zone, wherein solid particulate material is transferred from the second contacting zone to the first contacting zone.

In one embodiment, the process of the present invention utilises a plurality of contacting zones, each of said contacting zones being located one above the other, with feed gas being supplied to the lowermost contacting zone and passing upwardly and successively through each of the other contacting zones, the gas passing through each contacting zone being imparted with upward and circumferential velocity in each of said contacting zones and solid particulate material being supplied to the uppermost of said contacting zones, said solid particulate material thereafter being transferred downwardly from each contacting zone to the adjacent lower contacting zone, the solid particulate material being extracted from the lowermost contacting zone and wherein gas and solid particulate material are contacted with each other in each of the contacting zones.

Preferably each contacting zone is an annular contacting zone that is configured such that gas flowing through each contacting zone causes the formation of a turbulent band of solid particulate material in each contacting zone.

The plurality of contacting zones are located one above the other and are spaced axially. Preferably, the contacting zones are concentric and have substantially the same diameter.

The process of the present invention is suitable for use in a wide variety of gas-solid containing processes. Examples include, but are not limited to gas-solid adsorption, dry scrubbing, gas-solid contacting to achieve heat transfer from a hot solid to a cooler gas or vice-versa, drying operations and heterogeneous reactions. The process is especially suitable for use in dry scrubbing and adsorption processes.

The process of the present invention operates as a multi-stage, "counter current" gas-solid contacting process and allows simple transfer of solid particulate material from one contacting zone to the next downwardly adjacent contacting zone. This provides more efficient removal of components from the gaseous stream compared to the apparatus and process described in Australian Patent No. 616,406, which operates as a "cross current" contactor. Plant design is also simplified due to the requirement for less gas inlet feed systems.

The process of the present invention is particularly suitable for the removal of fluoride species, such as hydrogen fluoride, from gaseous streams by adsorption on alumina particles. In using the process of the present invention for the adsorption of hydrogen fluoride, the consumption of alumina is reduced because the fluoride loading on the alumina is increased.

It will be appreciated that the process for reducing the amount of fluorides in a gaseous stream may include passing the gaseous stream sequentially upwardly through a plurality of contacting zones located one above the other, the gaseous stream being imparted with an upward and circumferential velocity in each of the contacting zones, supplying alumina to an uppermost of the plurality of contacting zones, the alumina thereafter being transferred downwardly from each contacting zone to the adjacent lower contacting zone, alumina being extracted from the lowermost contacting zone and wherein the gaseous stream and alumina are contacted in each of the contacting zone.

Preferably, two contacting zones are used.

Preferably, the time of contact between the alumina and the gas passing through any one of the contacting zones is sufficient for the adsorption of fluorides onto alumina in that contacting zone to substantially reach equilibrium.

In a second aspect, the present invention provides an apparatus for contacting a solid particulate material with a gas, an apparatus for contacting a gas with solid particulate material, said apparatus comprising a plurality of annular contacting zones for contacting the gas with the solid particulate material, each of the plurality of contacting zones including means to impart an upward and circumferential velocity to the gas, and configured such that in use a toroidal band of particles is formed in each of the contacting zones.

gas supply means for supplying the gas to a lowermost contacting zone, gas removing means for removing the gas from an uppermost contacting zone, means for transferring the gas from each lower of the contacting zones to an upwardly adjacent contacting zone wherein the gas can pass successively from the lowermost contacting zone to each respective upwardly adjacent contacting zone, solid feeding means for feeding solid particulate material to the uppermost contacting zone, solid removing means for removing solid particulate material from the lowermost contacting zone, and means for transferring the solid particulate material from each upper of the contacting zones to a downwardly adjacent contacting zone wherein the solid particulate material can pass successively from the uppermost contacting zone to each respective downwardly adjacent contacting zone.

Preferably, the apparatus comprises two contacting zones in which the solid particulate material contacts the gas, the apparatus comprising a first contacting zone, means for feeding the gas to the first contacting zone, means for imparting an upward and circumferential velocity to the gas in the first contacting zone, a second contacting zone located above the first contacting zone, means for transferring exhaust gas from the first contacting zone to the second contacting zone, means for imparting an upward and circumferential velocity to the gas in the second contacting zone, means for removing exhaust gas from the second contacting zone, means for feeding solid particulate material to the second contacting zone, means for transferring solid particulate material from the second contacting zone to the first contacting zone and means for removing solid particulate material from the first contacting zone.

The apparatus of the present invention may include more than two contacting zones. In this case, each of the contacting zones may be located to define a series of contacting zones extending generally upwardly from a lowermost contacting zone to an uppermost contacting zone, means for imparting an upward and circumferential velocity to the gas in each contacting zone, the apparatus including means to transfer exhaust gas from one of the contacting zones to the adjacent upper contacting zones, the uppermost contacting zone including means to extract exhaust gas therefrom, means to transfer solid particulate material from one of the contacting zones to the adjacent lower contacting zone, the lowermost contacting zone including means to remove solid particulate therefrom, means for feeding solid particulate material to the uppermost contacting zone and means to feed gas to the lowermost contacting zone.

The apparatus of the present invention provides a multi-stage counter current gas-solid contacting system in which gas passes upwardly through a series of contacting zones to contact solid particulate material that is passing downwardly through the series of contacting zones.

It is preferred that the contacting zones are annular contacting zones. The contacting zones are preferably configured such that the gas flow through a particular contact zone results in the formation of a turbulent band of particles in each contacting zone. This assists in raising the rate of mass transfer between the gas and the solid, due to a reduction in the boundary layer around each particle in the turbulent band in the contacting zone.

The contacting zones are preferably spaced axially about a longitudinal axis of the apparatus. It is also preferred that the contacting zones are concentric about the longitudinal axis of the apparatus. More preferably, the contacting zones each have substantially the same diameter as the other contacting zones. This allows the contacting zones to be disposed within a single shell, which has apparent implications for reducing the capital costs associated with the apparatus.

The means for imparting upward and circumferential velocity to the gas in each contacting zone preferably comprising a series of angled blades extending around the bottom part of each contacting zone. The blades may be considered to define the lower boundary of each respective contacting zone. In use, gas flowing upwardly through the apparatus strikes a series of blades which causes the gas to be diverted circumferentially such that the gas flow acquires an upward component of velocity and a circumferential component of velocity as the gas flow passes through each contacting zone.

The apparatus is also provided with means to supply solid particulate material to the uppermost contacting zone. This means may comprise a feed pipe passing through the side wall of the apparatus and arranged to deliver the solid particulate material to the uppermost contacting zone. Alternatively, a cone distributor may be placed in conjunction with the uppermost contacting zone and solid particulate material fed to the cone distributor to be distributed to the contacting zone. As a further alternative, a spinning disc distributor may be positioned within the uppermost contacting zone and solid particulate material dropped onto the spinning disc, whereupon the solid particulate material is thrown outwardly into the uppermost contacting zone. Those skilled in the art will appreciate that other supply arrangements for supplying solid particulate material to the uppermost contacting zone may be used and the invention encompasses all such arrangements.

The means to transfer solid particulate material from one contacting zone to the adjacent, lower contacting zone may comprise a conduit for collecting overflow solid particulate material from the one contacting zone and transferring the overflow to the adjacent lower contacting zone. The conduit may be located inside the apparatus or it may be external to the apparatus. In cases where the conduit is located inside the apparatus, the conduit is preferably supplied with means to distribute the solid particulate material to the lower contacting zone. This may comprise a distribution cone located near the lower part of the conduit, or an overflow arrangement located in the lower part of the conduit.

The invention will now be described in greater detail with reference to the accompanying Figures, which show preferred embodiments of the invention.

In the embodiments shown in the Figures, the apparatus of the invention is used to reduce the fluorides content of an aluminium smelter off-gas by contacting the off-gas with particulate alumina to thereby adsorb fluorides on the alumina.

Figure 1:
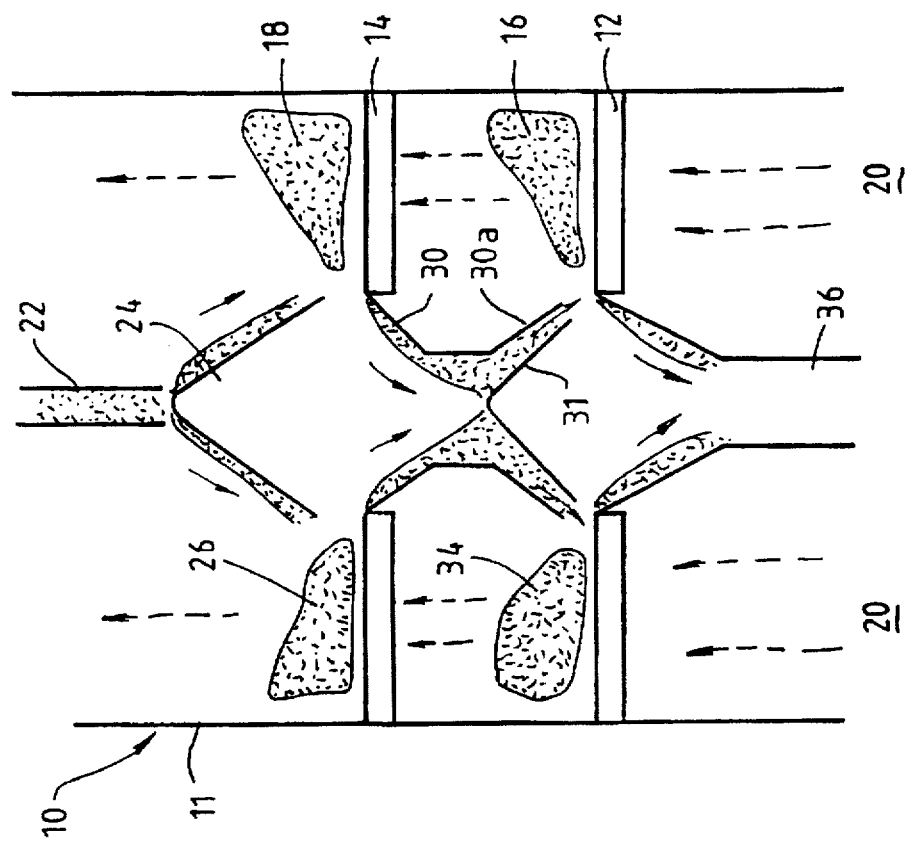
FIG. 1 shows one embodiment of an apparatus according to the present invention.

Referring to FIG. 1, the apparatus of the present invention 10 includes an outer shell 11. Two series of angled blades 12,14 define the lower part of first contacting zone 16 and second contacting zone 18, respectively. Fluoride containing off-gas 20, for example from an aluminium smelter, is supplied to the lower part of apparatus 10. The off-gas 20 flows upwardly through the apparatus and passes through angled blades 12 which direct the gas 20 in a direction that is less than 35° to a plane orthogonal to the axis of the first contacting zone 16, but preferably less than 25° to a plane orthogonal to the axis of the first contacting zone 16 so that the gas moves in a direction which is substantially circumferential to the contacting zone 16. After passing through the first contacting zone 16, the gas continues to flow upwardly whereupon it strikes the second set of angled blades 14. Again, the gas has a circumferential velocity component forced upon it by angled blades 14 to create a swirling gas flow in contacting zone 18. After passing through contacting zone 18, the gas exits the upper part of the apparatus. In the embodiment shown in FIG. 1, the gas flow is represented by dashed arrows.

Alumina is fed into the apparatus in a countercurrent direction to the gas flow via axial conduit 22 which feeds alumina onto a diverging conical feeder 24 to provide a uniform distribution of particulate material to contacting zone 18. The alumina enters contacting zone 18 where, by virtue of the swirling gas flow in the contacting zone, a turbulent band of alumina particles is formed. This is represented by reference numeral 26. The overflow alumina 28 from turbulent compact band 26 enters conduit 30 which is associated with an overflow catchment 32. Alumina 28 flows down conduit 30 due to gravity. When sufficient alumina has flowed down conduit 30 to fill overflow catchment 32, the alumina in the overflow catchment 32 flows over into first contacting zone 16. Again, a compact turbulent band of alumina particles 34 is produced in contacting zone 16 due to the swirling gas flow in contacting zone 16. Overflow alumina from contacting zone 16 passes down conduit 36 and is removed from the apparatus. In the embodiment shown in FIG. 1, the alumina flow is in a generally downwards direction and is represented by solid arrows.

Figure 2:
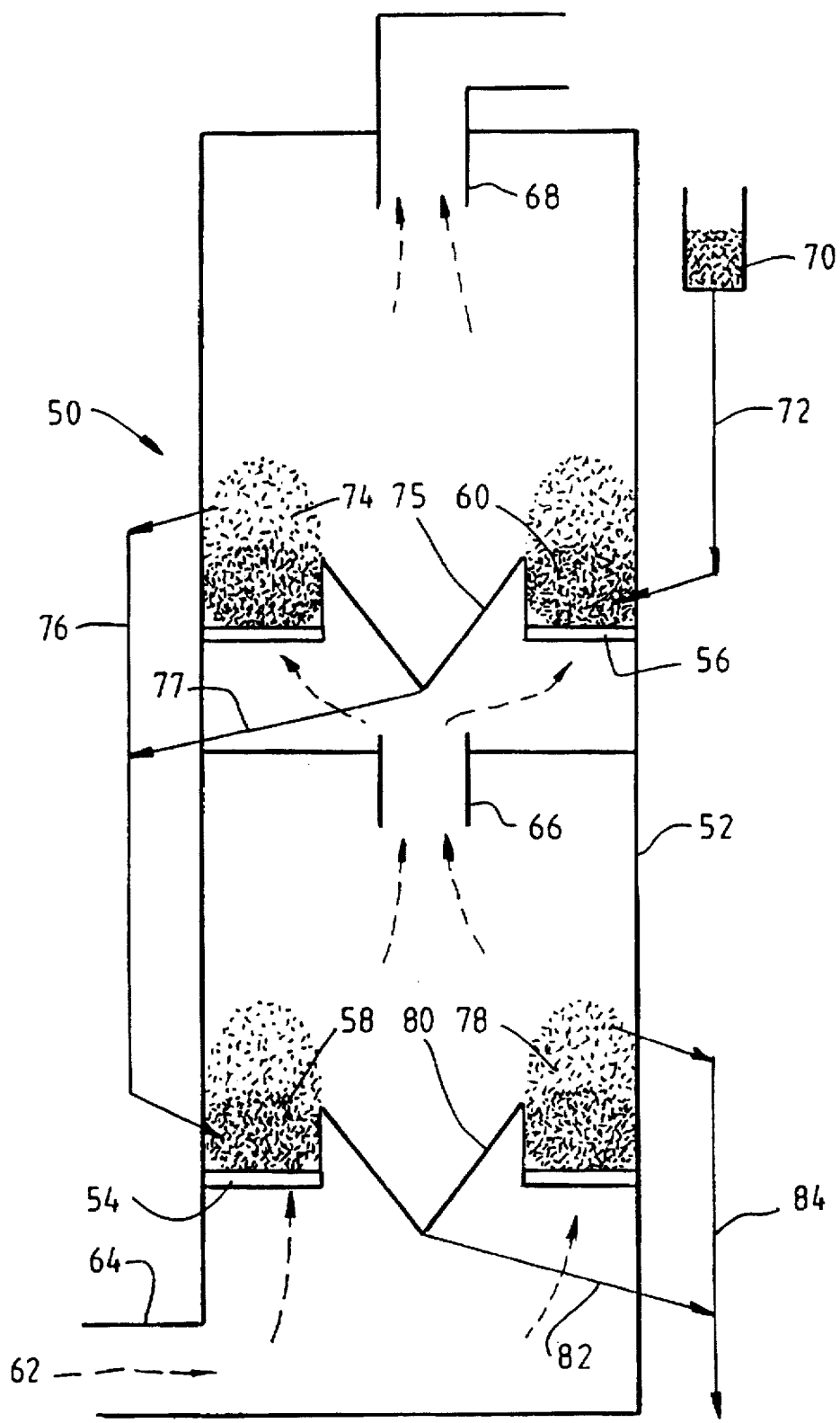
FIG. 2 shows an alternative embodiment of the apparatus of the present invention.

An alternative embodiment of the apparatus of the present invention is shown in FIG. 2. In this embodiment, apparatus 50 includes an outer shell 52 having a first set of blades 54 and a second set of blades 56 defining first contact zone 58 and second contact zone 60 respectively. Off-gas 62, for example from an aluminium smelter, is supplied to the lower part of apparatus 50 via feed conduit 64. The gas flow through the apparatus is in a generally upward direction and the gas flow is represented by the dashed arrows. In particular, gas 62 enters the lower part of the apparatus and flows upwardly until it strikes the first set of blades 54 which impart a swirling circumferential flow to the gas in contacting zone 58. The gas leaves contacting zone 58 and flows via constriction 66 to second set of blades 56. The second set of blades also impart a circumferential component to the gas velocity to produce a swirling gas flow in contacting zone 60. Having passed through contacting zone 60, the gas continues to flow upwardly and exits the apparatus via outlet conduit 68. Alumina is fed via hopper 70 and inlet conduit 72 to the second contacting zone 60. By virtue of the swirling gas flow in contacting zone 60, the alumina forms a turbulent band of particles 74. Overflow alumina from contacting zone 60 flows into chute 75 and exits the apparatus via conduit 77 or flows via external overflow conduit 76 to the first contacting zone 58. In first contacting zone 58, the swirling gas flow causes the alumina to form a turbulent band 78. Overflow alumina from contacting zone 58 flows into chute 80 and exits the apparatus via conduit 82 or flows via external overflow conduit 84.

In the apparatus shown in FIGS. 1 and 2, contact between the alumina and the fluorides containing gas is achieved in both the first and second contacting zones. This causes fluorides to be removed from the gas in each contacting zone due to fluorides being adsorbed on the alumina in each of the contacting zones. The flow regimes in the contacting zones are arranged such that the adsorption of fluorides on the alumina in each contacting zone substantially reaches equilibrium, which ensures that the maximum amount of fluorides is removed in each contacting zone.

allows the attainment of a multi-stage, countercurrent gas-solid adsorption process.

Because exhaust gas fluoride concentrations are limited to low levels, the maximum possible fluoride loading on the solid alumina is restricted. The result of this in conventional dry scrubbing processes is that there is a lower limit to the proportion of the primary alumina feed to an aluminium smelter which can be used in the dry scrubbing process to maintain emission levels. This restricts the amount of pure primary alumina feed available for production of high purity metal, a product which attracts a premium price. The current invention is able to reduce the lower limit of alumina needed for dry scrubbing significantly, resulting in a higher degree of primary alumina being available for purity metal production.

The series of experimental runs were carried out utilising both single stage, conventional dry scrubbing and two stage countercurrent dry scrubbing in accordance with the present invention. The results of these runs are shown in Table 1.

TABLE 1

| HF Concentration ($mg/Nm^3$) | Single Stage | | Two Stage Countercurrent | |
|---|---|---|---|---|
| | Alumina Consumption (% Total) | Concentration of HF at Exhaust (mg $HF/Nm^3$) | Alumina Consumption (% Total) | Concentration of HF at Exhaust (mg $HF/Nm^3$) |
| 93 $mg/Nm^3$ | 58 | 2 | 25 | <1 |
| 400 $mg/Nm^3$ | 100 | 7 | 100 | 1 |
| 290 $mg/Nm^3$ | 100 | 3.5 | 64 | <1 |
| 350 $mg/Nm^3$ | 100 | 4.8 | 77 | 1 |

Figure 3:
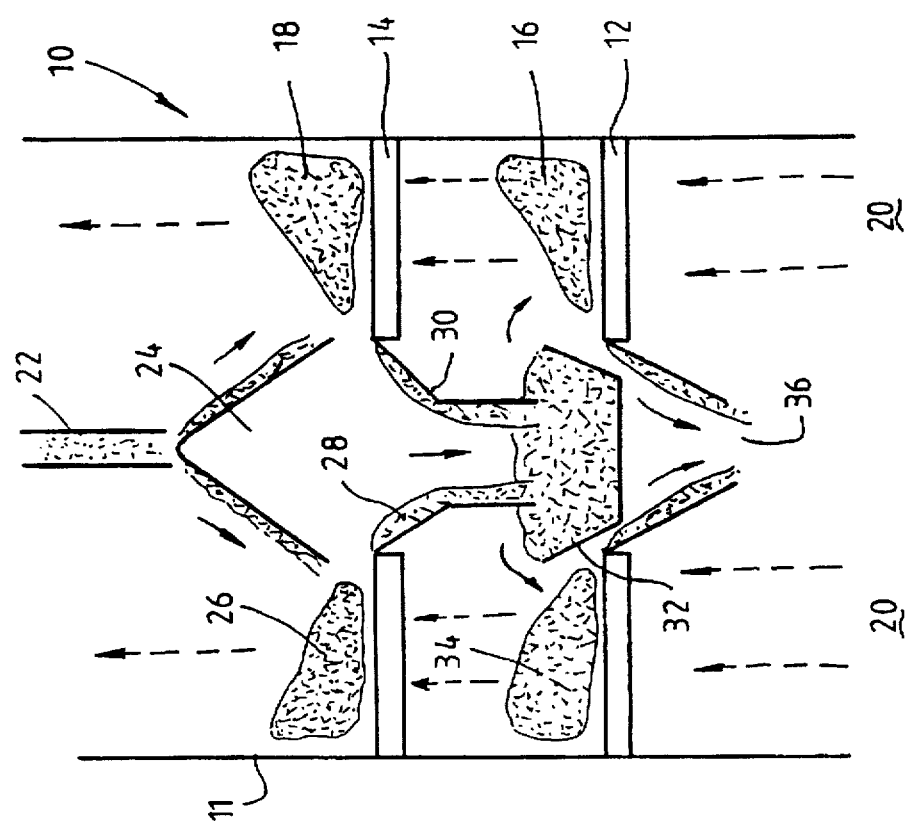
FIG. 3 shows an alternative construction for the means for transferring solid particulate material from one contacting stage to the adjacent, lower stage.

FIG. 3 shows an alternative arrangement for transferring alumina from the second contacting zone 18 to the first contacting zone 16. It is noted that the arrangement of FIG. 3 is essentially identical to that of FIG. 1, with the exception of the transfer means. Accordingly, like parts have been given like numbers. In the apparatus shown in FIG. 3, transfer conduit 30 includes a divergent bottom end 30a. Conical feeder 31 is located within the divergent bottom end 30a of the conduit and acts to distribute alumina to the first contacting zone 16.

In order to demonstrate the advantages of using the present invention for the adsorption of fluorides from gas streams, a series of experimental runs were carried out comparing the apparatus of the invention with conventional dry scrubbing techniques.

The key to minimising alumina consumption in dry scrubbing processes is to increase the fluoride loading on the exposed alumina product. The extent of fluoride adsorption onto alumina is proportional to the concentration of fluorides in the gas phase. Therefore, maximum fluoride loading would be achieved if the product alumina was in equilibrium with the incoming raw gas, which has the highest fluoride concentration. This ideal situation can be approached by having a series of gas-solid contacting stages arranged so that movement of the gas and solid phases is countercurrent. Such an arrangement also minimises fluoride emissions as the exhaust gas approaches equilibrium with the incoming virgin alumina. The apparatus of the present invention By analysing the results shown in Table 1, it can be seen that the amount of alumina required to be used in the dry scrubbing process of the smelter off-gases can be reduced by using two stage countercurrent dry scrubbing. This opens up the possibility of improved production of high purity metal. Furthermore, the results show that acceptable HF exhaust concentrations are achieved even with increasing inlet concentrations of HF.

According to teachings of International Patent Application No. PCT/AU91/00342, the fine fraction of alumina sized below 45 microns adsorbs a disproportionate amount of contaminant trace metals in the off-gas stream. Therefore, it is possible and may be preferable to configure the apparatus of the present invention such that this fine fraction of alumina becomes entrained in the gas leaving the apparatus and therefore reduces the amount of contaminant trace metals returned to the smelter.

It will also be appreciated that the exhaust gas leaving the apparatus should be cleaned prior to venting in order to remove any entrained solids. For example, the exhaust gas may be passed through a baghouse prior to venting.

To further demonstrate the advantages of using the present invention for the adsorption of fluorides from gas streams over conventional, single stage systems, a series of tests has been conducted on a commercial scale prototype apparatus. This apparatus is being used to demonstrate the performance of both single stage and two stage countercurrent dry scrubbing of HF from aluminium smelter off-gases in accordance with the present invention. Table 2 shows the results of operation at a variety of levels of alumina. These results show that by modifying the process from single stage to two stage counter-current, the level of HF in the final off-gas from the apparatus is reduced significantly.

TABLE 2

| Alumina Level % Of Total Smelter Feed | Two Stage Countercurrent % HF Extracted from off-gas | Single Stage % HF Extracted from off-gas |
|---|---|---|
| 66 | 99.9 | 98.9 |
| 50 | 99.9 | 96.6 |
| 33 | 99.5 | 89.9 |

We claim:

1. A process for contacting a gas with solid particulate material in a plurality of annular contacting zones comprising supplying a feed gas to a lowermost contacting zone and thereafter passing the feed gas successively through each other of the plurality of contacting zones wherein the gas leaving one contacting zone passes to an upwardly adjacent contacting zone supplying solid particulate material to an uppermost contacting zone and thereafter transferring the solid particulate material successively to each other of the plurality of contacting zones wherein the solid particulate material is transferred from one contacting zone to a downwardly adjacent contacting zone wherein the gas passing through each of the plurality of contacting zones is imparted with upward and circumferential velocity in each of the contacting zones and the gas contacts the solid particulate material in each of the plurality of contacting zones and a toroidal band of particles is formed in each of the plurality of contacting zones, and extracting solid particulate material from the lowermost contacting zone.

2. A process as claimed in claim 1 wherein the plurality of contacting zones comprises two contacting zones and the process comprises contacting solid particulate material with a gas comprising supplying a gas to a first contacting zone, said gas being imparted with an upward and circumferential velocity in the first contacting zone, the gas contacting solid particulate material in the first contacting zone, removing an exhaust gas from the first contacting zone and recovering a treated solid particulate material from the first contacting zone, supplying the exhaust gas from the first contacting zone to a second contacting zone, the second contacting zone being located above the first contacting zone, the gas being imparted with an upward and circumferential velocity in the second contacting zone, the gas contacting solid particulate material in the second contacting zone, wherein solid particulate material is transferred from the second contacting zone to the first contacting zone.

3. A process as claimed in claim 1 wherein the solid particulate material is transferred from one of the plurality of contacting zones to a next of the plurality of contacting zones by removing solid particulate material from near or at a periphery of the one contacting zone and transferring the removed solid particulate material through an external conduit to the next contacting zone.

4. A process as claimed in claim 1 wherein the plurality of contacting zones are located one above the other and are spaced axially.

5. A process as claimed in claim 4 wherein the contacting zones have a common axis and have substantially equal diameters.

6. A process as claimed in claim 1 wherein the process is used to scrub one or more contaminants from a gas stream by contacting the gas stream with a solid particulate material that is an adsorbent for the one or more contaminants.

7. A process as claimed in claim 6 wherein the gas stream contains hydrogen fluoride and the solid particulate material is alumina.

8. A process as claimed in claim 6 wherein the gas stream and the solid particulate material contact each other in each of the contacting zones for a period of time sufficient to enable adsorption of the one or more contaminants on the solid particulate material to reach equilibrium in each contacting zone.

9. An apparatus for contacting a gas with solid particulate material, said apparatus comprising a plurality of annular contacting zones for contacting the gas with the solid particulate material, each of the plurality of contacting zones including means to impart an upward and circumferential velocity to the gas and configured such that in use a toroidal band of particles is formed in each of the contacting zones, gas supply means for supplying the gas to a lowermost contacting zone, gas removing means for removing the gas from an uppermost contacting zone, means for transferring the gas from each lower of the contacting zones to an upwardly adjacent contacting zone wherein the gas can pass successively from the lowermost contacting zone to each respective upwardly adjacent contacting zone, solid feeding means for feeding solid particulate material to the uppermost contacting zone, solid removing means for removing solid particulate material from the lowermost contacting zone, and means for transferring the solid particulate material from each upper of the contacting zones to a downwardly adjacent contacting zone wherein the solid particulate material can pass successively from the uppermost contacting zone to each respective downwardly contacting zone.

10. An apparatus as claimed in claim 9 wherein the apparatus comprises two contacting zones, the apparatus including a first contacting zone, means for feeding the gas to the first contacting zone, means for imparting an upward and circumferential velocity to the gas in-the first contacting zone, a second contacting zone located above the first contacting zone, means for transferring exhaust gas from the first contacting zone to the second contacting zone, means for imparting an upward and circumferential velocity to the gas in the second contacting zone, means for removing exhaust gas from the second contacting zone, means for feeding solid particulate material to the second contacting zone, means for transferring solid particulate material from the second contacting zone to the first contacting zone and means for removing solid particulate material from the first contacting zone.

11. An apparatus as claimed in claim 9 wherein the contacting zones are spaced axially along a longitudinal axis of the apparatus.

12. An apparatus as claimed in claim 11 wherein the contacting zones each have substantially equal diameter.

13. An apparatus as claimed in claim 12 wherein the contacting zones are disposed within a single shell.

14. An apparatus as claimed in claim 9 wherein the means for imparting upward and circumferential velocity to the gas comprises a series of angled blades extending around a bottom part of each contacting zone.

15. An apparatus as claimed in claim 9 wherein the means for supplying solid particulate material to the uppermost contacting zone comprises a feed pipe passing through a side wall of the apparatus and arranged to deliver solid particulate material to the uppermost contacting zone.

16. An apparatus as claimed in claim 9 wherein the means to transfer solid particulate material from one contacting zone to the downwardly adjacent contacting zone includes one or more conduits arranged for collecting overflow solid particulate material from the one contacting zone and transferring the overflow solid particulate material to the downwardly adjacent contacting zone.

\* \* \* \* \*